(12) United States Patent
Ishii et al.

(10) Patent No.: US 8,686,704 B2
(45) Date of Patent: Apr. 1, 2014

(54) CURRENT SENSE CIRCUIT AND SWITCHING REGULATOR USING THE SAME

(75) Inventors: Takuya Ishii, Osaka (JP); Takashi Ryu, Kyoto (JP); Satoshi Wada, Osaka (JP)

(73) Assignee: Panasonic Corporation, Osaka (JP)

( * ) Notice: Subject to any disclaimer, the term of this patent is extended or adjusted under 35 U.S.C. 154(b) by 848 days.

(21) Appl. No.: 12/721,054

(22) Filed: Mar. 10, 2010

(65) Prior Publication Data

US 2010/0289473 A1 Nov. 18, 2010

(30) Foreign Application Priority Data

May 12, 2009 (JP) .................................. 2009-115848

(51) Int. Cl.
*G05F 1/56* (2006.01)
*G05F 1/565* (2006.01)
*G05F 1/575* (2006.01)

(52) U.S. Cl.
USPC .......................................... 323/284; 323/285

(58) Field of Classification Search
USPC ................... 323/271, 273–285, 289
See application file for complete search history.

(56) References Cited

U.S. PATENT DOCUMENTS

| | | |
|---|---|---|
| 6,377,034 B1 | 4/2002 | Ivanov |
| 7,102,337 B2 | 9/2006 | Wheeler et al. |
| 7,408,388 B2 | 8/2008 | Nagasawa et al. |
| 2008/0079410 A1* | 4/2008 | Ishii et al. ..................... 323/284 |
| 2008/0211475 A1* | 9/2008 | Ishii et al. ..................... 323/285 |
| 2010/0225292 A1* | 9/2010 | Nishimori et al. ............ 323/288 |
| 2012/0032660 A1* | 2/2012 | Nakamura .................... 323/288 |

* cited by examiner

*Primary Examiner* — Adolf Berhane
*Assistant Examiner* — Nusrat Quddus
(74) *Attorney, Agent, or Firm* — McDermott Will & Emery LLP (57) ABSTRACT

A current sense circuit for use with a switching regulator including a first transistor, connected to an inductor, configured to switch a current flowing through the inductor from a power supply; and a second transistor, connected to a node to which the inductor and the first transistor are connected, configured to be turned on during a part of an OFF period of the first transistor. The current sense circuit includes a current generator configured to generate a sense current corresponding to a current flowing through the first transistor; a hold circuit configured to output a voltage corresponding to the sense current during an ON period of the first transistor, and to hold and output the voltage corresponding to the sense current during the OFF period of the first transistor; and an output transistor configured to generate a current corresponding to the voltage output by the hold circuit.

17 Claims, 8 Drawing Sheets

PRIOR ART

FIG.9

PRIOR ART

CURRENT SENSE CIRCUIT AND SWITCHING REGULATOR USING THE SAME

CROSS-REFERENCE TO RELATED APPLICATION

This application claims priority to Japanese Patent Application No. 2009-115848 filed on May 12, 2009, the disclosure of which including the specification, the drawings, and the claims is hereby incorporated by reference in its entirety.

BACKGROUND

The technique disclosed in the present application relates to switching regulators for supplying DC (direct current) voltage to various electronic devices, and current sensing circuits used for such switching regulators.

In recent years, switching regulators have been used as power supplies for a variety of electronic devices because of their high-efficiency power conversion. A buck converter, which is an example of such switching regulators, includes a switching transistor for chopping at a high frequency a DC input voltage of 3-4 V supplied by, for example, a lithium ion battery; an inductor for smoothing a pulsed output from the switching transistor; an output capacitor; and a control circuit, thereby supplying a DC power supply voltage of 1-2 V to a load.

The control circuit monitors the output voltage supplied from the output capacitor to the load, thereby controlling an on/off time of the switching transistor so that the output voltage is regulated. Examples of methods for controlling the switching regulators include current mode control methods, which have frequently been used, where the output voltage is regulated by controlling the switching transistor by sensing the current flowing through the inductor.

Figure 8:
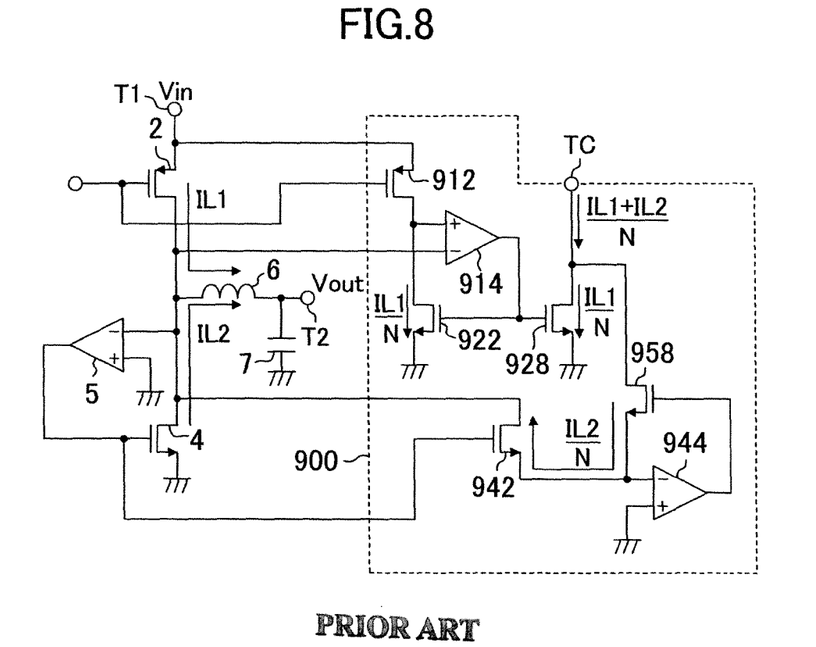
FIG. 8 is a circuit diagram showing an example configuration of a conventional switching regulator.
Figure 9:
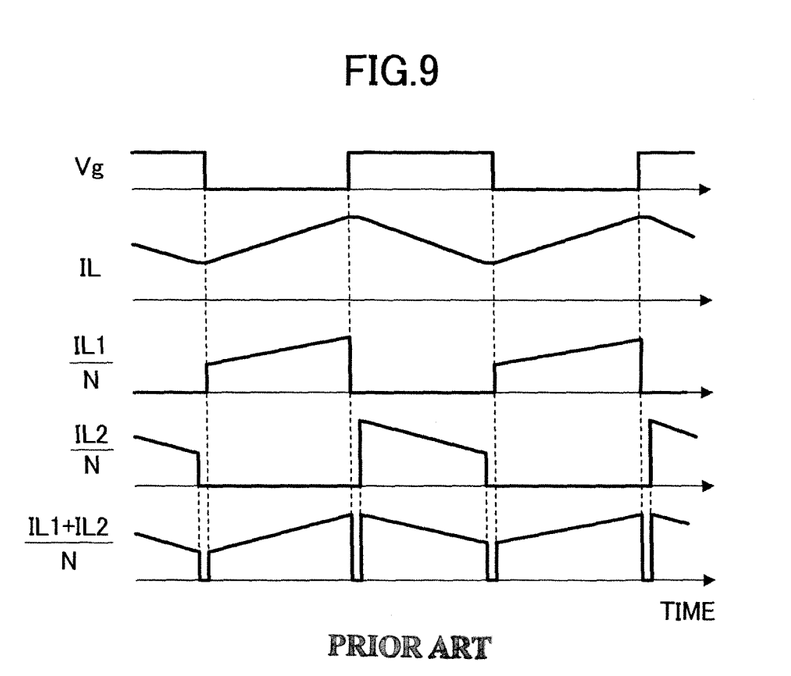
FIG. 9 is a graph showing signal waveforms in the switching regulator of FIG. 8.

FIG. 8 is a circuit diagram showing an example configuration of a conventional switching regulator. The switching regulator of FIG. 8, which is described in U.S. Pat. No. 6,377,034, includes an inductor current sense circuit 900. FIG. 9 is a graph showing signal waveforms in the switching regulator of FIG. 8. In FIG. 8, a DC voltage Vin is input to an input node T1. A drive signal for switching a transistor 2 is applied to the gate of the transistor 2. The drain of a rectifying transistor 4 is connected to the drain of the transistor 2. A comparator 5 compares the drain voltage of the transistor 4 with ground potential, and drives the transistor 4 by a signal indicative of the comparison result.

One end of an inductor 6 is connected to a node connecting the transistor 2 to the transistor 4. An output capacitor 7 is connected to an output node T2, which is another end of the inductor 6. An output voltage Vout is supplied from the output node T2 to the load. A current flowing through the inductor 6 is (IL1+IL2), where a current flowing through the transistor 2 is denoted by IL1, and a current flowing through the transistor 4 is denoted by IL2.

The source and gate of a sense transistor 912 are connected to the source and gate of the transistor 2, respectively. The size of the sense transistor 912 is assumed to be 1/N times that of the transistor 2. Since the drain-source impedance of a transistor 922 is adjusted by a differential amplifier 914 so that the drain voltage of the transistor 2 is equal to the drain voltage of the transistor 912, a current of IL1/N flows through the transistors 912 and 922. The transistor 922 and a transistor 928 form a current mirror, and thus, the current of IL1/N flows through the transistor 928.

The drain and gate of a transistor 942 are connected to the drain and gate of the transistor 4, respectively. The size of the sense transistor 942 is assumed to be 1/N times that of the transistor 4. Since the drain-source impedance of a transistor 958 is adjusted by a differential amplifier 944 so that the source voltage of the transistor 942 is equal to ground potential, a current of IL2/N flows through the transistors 942 and 958. A current flowing into a node TC will be (IL1+IL2)/N, and thus, the inductor current (IL1+IL2) can be sensed.

However, the current sense circuit 900 of FIG. 8 poses a problem that the current cannot be sensed during a dead time, etc. when both of the transistors 2 and 4 are turned off. As shown in FIG. 9, for example, the current IL flowing through the inductor is continuous, whereas the current (IL1+IL2)/N obtained by the current sense circuit 900 is discontinuous. In particular, average current mode control schemes, which control an average value of the inductor current, present a problem that it is difficult to control a switching regulator according to such a discontinuous signal.

SUMMARY

It is an object of the invention to generate a continuous signal corresponding to a current flowing through an inductor in a switching regulator.

A current sense circuit according to an example embodiment of the invention is a current sense circuit for use with a switching regulator including a first transistor, connected to an inductor, configured to switch a current flowing through the inductor from a power supply; and a second transistor, connected to a node to which the inductor and the first transistor are connected, configured to be turned on during a part of an OFF period of the first transistor. The current sense circuit includes a current generator configured to generate a sense current corresponding to a current flowing through the first transistor; a hold circuit configured to output a voltage corresponding to the sense current during an ON period of the first transistor, and to hold and output the voltage corresponding to the sense current during the OFF period of the first transistor; and an output transistor configured to generate a current corresponding to the voltage output by the hold circuit.

This configuration holds the voltage corresponding to the sense current when the first transistor is turned off As a result, without having to sense the current of the second transistor, a continuous signal corresponding to a current flowing through the inductor can be obtained.

A current sense circuit according to another example embodiment of the invention is a current sense circuit for use with a switching regulator including a first transistor, connected to an inductor, configured to switch a current flowing through the inductor from a power supply; and a second transistor, connected to a node to which the inductor and the first transistor are connected, configured to be turned on during a part of an OFF period of the first transistor. The current sense circuit includes a current generator configured to generate a sense current corresponding to a current flowing through the second transistor; a hold circuit configured to output a voltage corresponding to the sense current during an ON period of the second transistor, and to hold and output the voltage corresponding to the sense current during the OFF period of the second transistor; and an output transistor configured to generate a current corresponding to the voltage output by the hold circuit.

This configuration holds the voltage corresponding to the sense current when the second transistor is turned off As a result, the current of the first transistor is not sensed, thereby obtaining a continuous signal corresponding to a current flowing through the inductor.

A current sense circuit according to still another example embodiment of the invention is a current sense circuit for use with a switching regulator including a first transistor, connected to an inductor, configured to switch a current flowing through the inductor from a power supply; and a second transistor, connected to a node to which the inductor and the first transistor are connected, configured to be turned on during a part of an OFF period of the first transistor. The current sense circuit includes a first current generator configured to generate a first sense current corresponding to a current flowing through the first transistor; a first hold circuit configured to output a voltage corresponding to the first sense current during an ON period of the first transistor, and to hold and output the voltage corresponding to the first sense current during a period when both of the first and the second transistors are turned off; a first output transistor configured to generate a current corresponding to the voltage output by the first hold circuit; a second current generator configured to generate a second sense current corresponding to a current flowing through the second transistor; a second hold circuit configured to output a voltage corresponding to the second sense current during an ON period of the second transistor, and to hold and output the voltage corresponding to the second sense current during the period when both of the first and the second transistors are turned off; and a second output transistor configured to generate a current corresponding to the voltage output by the second hold circuit. The first and the second output transistors are connected in parallel.

This configuration holds the voltage corresponding to the first sense current when the first transistor is turned off, and holds the voltage corresponding to the second sense current when the second transistor is turned off. As a result, abrupt changes in the value of the output signal do not occur even during the dead time period. Therefore, a continuous signal corresponding to the current flowing through the inductor can be obtained.

A switching regulator according to an example embodiment of the invention includes an inductor; a first transistor, connected to an inductor, configured to switch a current flowing through the inductor from a power supply; a second transistor, connected to a node to which the inductor and the first transistor are connected, configured to be turned on during a part of an OFF period of the first transistor; and a current sense circuit. The current sense circuit includes a current generator configured to generate a sense current corresponding to a current flowing through the first transistor; a hold circuit configured to output a voltage corresponding to the sense current during an ON period of the first transistor, and to hold and output the voltage corresponding to the sense current during the OFF period of the first transistor; and an output transistor configured to generate a current corresponding to the voltage output by the hold circuit.

A switching regulator according to another example embodiment of the invention includes an inductor; a first transistor, connected to an inductor, configured to switch a current flowing through the inductor from a power supply; a second transistor, connected to a node to which the inductor and the first transistor are connected, configured to be turned on during a part of an OFF period of the first transistor; and a current sense circuit. The current sense circuit includes a current generator configured to generate a sense current corresponding to a current flowing through the second transistor; a hold circuit configured to output a voltage corresponding to the sense current during an ON period of the second transistor, and to hold and output the voltage corresponding to the sense current during the OFF period of the second transistor; and an output transistor configured to generate a current corresponding to the voltage output by the hold circuit.

A switching regulator according to still another example embodiment of the invention includes an inductor; a first transistor, connected to an inductor, configured to switch a current flowing through the inductor from a power supply; a second transistor, connected to a node to which the inductor and the first transistor are connected, configured to be turned on during a part of an OFF period of the first transistor; and a current sense circuit. The current sense circuit includes a first current generator configured to generate a first sense current corresponding to a current flowing through the first transistor; a first hold circuit configured to output a voltage corresponding to the first sense current during an ON period of the first transistor, and to hold and output the voltage corresponding to the first sense current during a period when both of the first and the second transistors are turned off; a first output transistor configured to generate a current corresponding to the voltage output by the first hold circuit; a second current generator configured to generate a second sense current corresponding to a current flowing through the second transistor; a second hold circuit configured to output a voltage corresponding to the second sense current during an ON period of the second transistor, and to hold and output the voltage corresponding to the second sense current during the period when both of the first and the second transistors are turned off; and a second output transistor configured to generate a current corresponding to the voltage output by the second hold circuit. The first and the second output transistors are connected in parallel.

As described in detail below, the embodiments of the invention can obtain a continuous signal corresponding to a current flowing through the inductor. As such, the embodiments may be advantageous for use with a current sense circuit, a switching regulator, etc. In addition, use of the obtained signal enables a switching regulator to operate using an average current mode control, thereby allowing for regulation of the output voltage without malfunction due to switching noise.

DETAILED DESCRIPTION

Embodiments of the present invention will be described hereinafter referring to the drawings. In the drawings, like components are labeled with like numerals, while components that are alike (possibly identical but at least very similar) are labeled with numbers that share the last two digits (e.g., 80, 380 and 480). Note that this does not mean that the components that are labeled with identical numerals are required to be identical, but only means that, in these example implementations, they likely do not change between environments.

Note that, the term "connect" is intended to encompass direct connection or indirect connection. Such indirect connection may be referred to as "coupling" in this field of technology as appreciated by those skilled in the art.

First Embodiment

Figure 1:
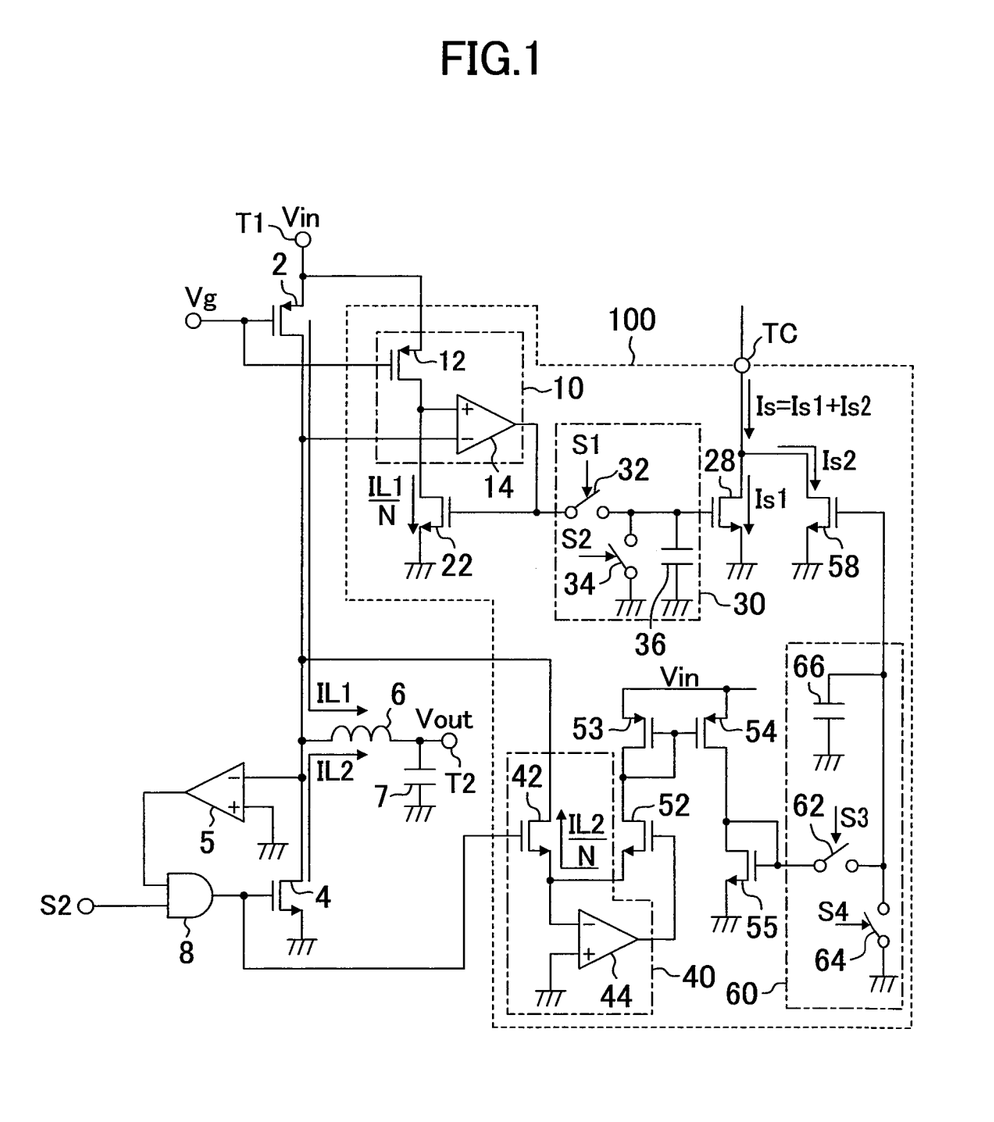
FIG. 1 is a circuit diagram illustrating an example configuration of a switching regulator including a current sense circuit according to a first embodiment.

FIG. 1 is a circuit diagram illustrating an example configuration of a switching regulator including a current sense circuit according to a first embodiment. The switching regulator of FIG. 1 includes a switching transistor 2, a rectifying transistor 4, a comparator 5, an inductor 6, an output capacitor 7, an AND circuit 8, and a current sense circuit 100. The switching transistor 2 and the rectifying transistor 4 form an output circuit of the switching regulator of FIG. 1.

The current sense circuit 100 includes current generation circuits 10, 40, auxiliary transistors 22, 52, output transistors 28, 58, hold circuits 30, 60, PMOSFETs (p-channel metal-oxide semiconductor field-effect transistors) 53, 54, and an NMOSFET (n-channel metal-oxide semiconductor field-effect transistor) 55. The current generation circuit 10 includes a sense transistor 12, and a differential amplifier 14. The hold circuit 30 includes a switch 32, an auxiliary switch 34, and a capacitor 36. The current generation circuit 40 includes a sense transistor 42, and a differential amplifier 44. The hold circuit 60 includes a switch 62, an auxiliary switch 64, and a capacitor 66.

A power supply such as a battery, etc. is connected to an input node T1, where a DC (direct current) voltage Vin is input. The switching transistor 2 is a PMOSFET, of which source is connected to the input node T1. A drive signal Vg for switching the transistor 2 is input to the gate of the transistor 2. One end of an inductor 6 is connected to the drain of the transistor 2. The rectifying transistor 4 is an NMOSFET, of which drain is connected to a node connecting the switching transistor 2 to the inductor 6. The source of the rectifying transistor 4 is grounded. The output capacitor 7 is connected to an output node T2, which is another end of the inductor 6. The output capacitor 7 smoothes an output voltage Vout, and supplies the smoothed voltage from the output node T2 to a load.

The switching transistor 2 and the rectifying transistor 4 are alternately turned on to cause an inductor current to flow through the inductor 6, thereby supplying the current to the output capacitor 7. Here, in order to prevent a period from occurring during which the switching transistor 2 and the rectifying transistor 4 are concurrently turned on during the switching, a dead time period is provided, during which both of the switching transistor 2 and the rectifying transistor 4 are turned off This allows the rectifying transistor 4 to be turned on during only a part of an OFF period of the switching transistor 2 in actual operation. Assume that an inductor current IL1 flows through the switching transistor 2 and the inductor 6, and that an inductor current IL2 flows through the rectifying transistor 4 and the inductor 6. The current sense circuit 100 generates a current Is, which is approximately proportional to an inductor current IL=IL1+IL2.

A comparator 5 compares the drain voltage of the rectifying transistor 4 with ground potential, and outputs the comparison result to the AND circuit 8. The AND circuit 8 performs a logical AND operation on the output of the comparator 5, and a control signal S2, and outputs the result to the gate of the rectifying transistor 4.

Such a configuration allows the rectifying transistor 4 to provide a rectifying function. Specifically, when a current flows from the source of the transistor 4 to the drain of the transistor 4, the drain voltage of the rectifying transistor 4 falls below ground potential due to voltage drop, and thus, the comparator 5 outputs a high level voltage to turn on the rectifying transistor 4. Here it is assumed that the control signal S2 is high, and that a drive signal Vg2 is low. On the other hand, when the current is about to flow in an opposite direction, the comparator 5 outputs a low level voltage to turn off the rectifying transistor 4.

In the current sense circuit 100 shown in FIG. 1, the first sense transistor 12 is a PMOSFET having its source and gate connected to the source and the gate of the switching transistor 2, respectively, and thus, operates synchronously with and similarly to the switching transistor 2. It is assumed that the size of the first sense transistor 12 is 1/N times that of the switching transistor 2. The value of N is in the order of, for example, thousands to ten thousands. The size of a transistor means, for example, a gate width of the transistor, or a ratio of a gate width to a gate length of the transistor. It is assumed that the size of the transistor 22 is the same as that of the transistor 28.

The current through the first sense transistor 12 flows through the auxiliary transistor 22, which is an NMOSFET. The differential amplifier 14 amplifies a difference between the drain voltages of the switching transistor 2 and the first sense transistor 12, and outputs the amplified difference to the gate of the auxiliary transistor 22. This configuration adjusts the impedance between the drain and source of the auxiliary transistor 22 so that the drain voltage of the switching transistor 2 is equal to the drain voltage of the first sense transistor 12. As such, the transistor 12 conducts a current IL1/N, which is in precise proportion to the current IL1. The auxiliary transistor 22 also conducts the current IL1/N.

The gate of the transistor 28 is connected to the gate of the transistor 22 through the switch 32, and thus, the transistors 22 and 28 form a current mirror. When the switch 32 is on (or closed), the transistor 28 conducts the current IL1/N and the transistor 22 conducts the current IL1/N. The auxiliary switch 34 and the capacitor 36 are connected in parallel between the gate and source of the transistor 28. The drain of the transistor 28 is connected to the output node TC. The switch 32 and the auxiliary switch 34 operate based on the control signals S1 and S2, respectively.

The second sense transistor 42 is an NMOSFET having its drain and gate connected to the drain and gate of the rectifying transistor 4, respectively, and thus, operates synchronously with and similarly to the rectifying transistor 4. It is assumed that the size of the second sense transistor 42 is 1/N times that of the rectifying transistor 4. It is assumed that the size of the transistor 42 is the same as that of the transistor 52. It is assumed that the size of the transistor 53 is the same as that of the transistor 54. It is assumed that the size of the transistor 55 is the same as that of the transistor 58.

The differential amplifier 44 amplifies a difference between the source voltage of the transistor 42 and ground potential, and outputs the amplified difference to the gate of the auxiliary transistor 52. The source of the transistor 52 is connected to the source of the transistor 42. The drain of the transistor 52 is connected to the gate and drain of the transistor 53, which is a PMOSFET.

The transistors 53 and 54 form a current mirror. The sources of the transistors 53 and 54 are connected to the input node T1. The drain of the transistor 54 is connected to the drain and gate of the transistor 55, which is an NMOSFET. The source of the transistor 55 is grounded. This configuration adjusts the impedance between the drain and source of the auxiliary transistor 52 so that the source voltage of the transistor 42 is equal to ground potential. As such, the transistor 42 conducts a current IL2/N, which is in precise proportion to the current IL2. The auxiliary transistor 52 also conducts the current IL2/N.

The current mirror formed by the transistors 53 and 54 allows the current IL2/N to flow from the drain of the transistor 54, which in turn flows through the transistor 55. The gate of the transistor 58 is connected to the gate of the transistor 55 through the switch 62, and thus, the transistors 55 and 58 form a current mirror. When the switch 62 is ON (or closed), the transistor 58 conducts the current IL2/N and the transistor 55 conducts the current IL2/N. The auxiliary switch 64 and the capacitor 66 are connected in parallel between the gate and source of the transistor 58. The drain of the transistor 58 is connected to the output node TC. The switch 62 and the auxiliary switch 64 operate based on the control signals S3 and S4, respectively.

The current generation circuits 10, 40 described above are merely illustrative, and other circuit configurations may be employed to generate currents which are in proportion to the currents IL1, IL2.

Figure 2:
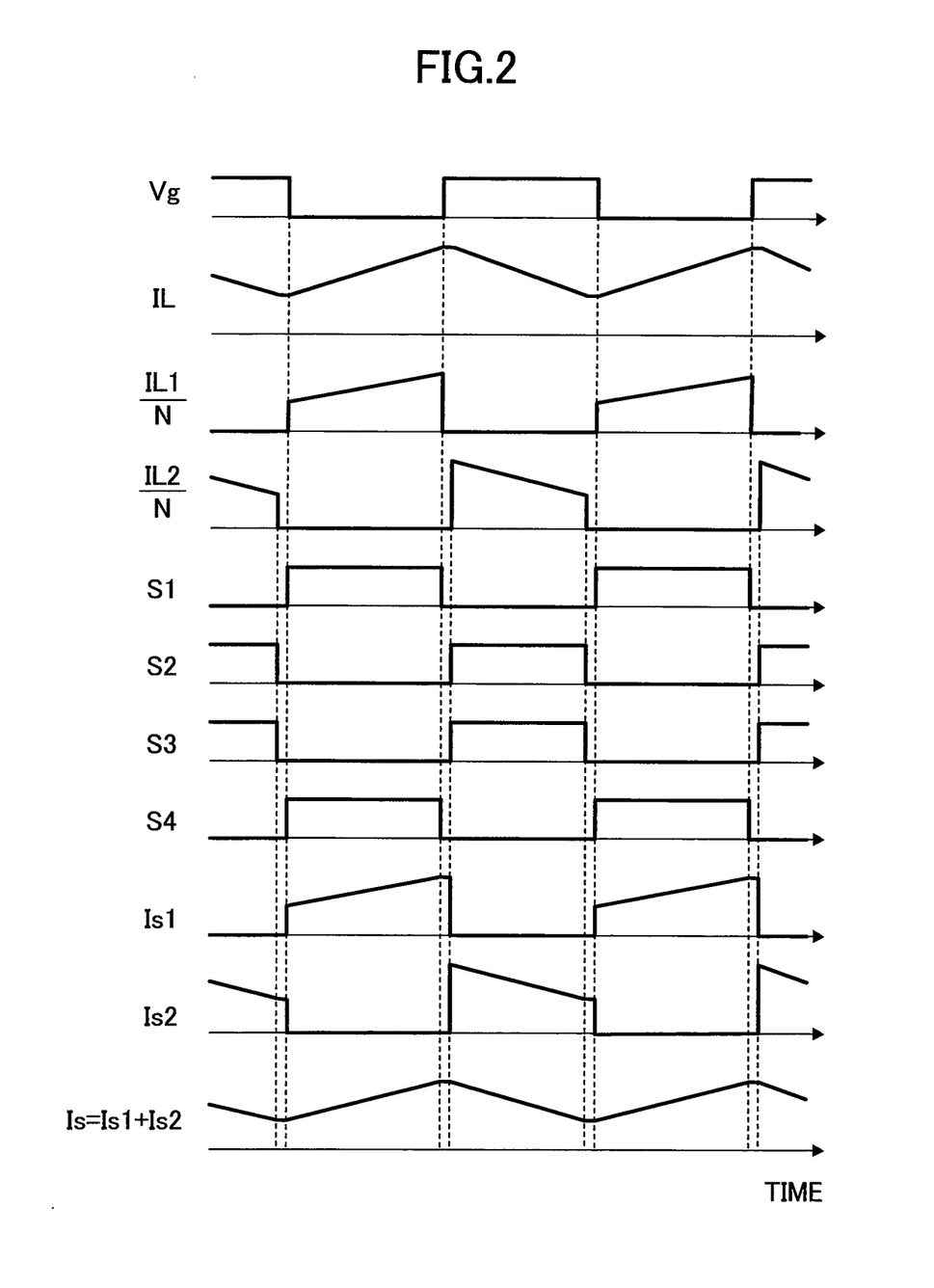
FIG. 2 is a graph illustrating waveforms of signals in the switching regulator of FIG. 1.

FIG. 2 is a graph illustrating waveforms of signals in the switching regulator of FIG. 1. FIG. 2 illustrates the drive signal Vg to the switching transistor 2, the current IL flowing through the inductor 6, the sense current IL1/N flowing through the first sense transistor 12, the sense current IL2/N flowing through the second sense transistor 42, the control signal S1 of the switch 32, the control signal S2 of the auxiliary switch 34, the control signal S3 of the switch 62, the control signal S4 of the auxiliary switch 64, the sense current Is1 flowing through the transistor 28, the sense current Is2 flowing through the transistor 58, and the sense current (Is1+Is2) flowing into the output node TC. Operation of the current sense circuit 100 of FIG. 1 will now be described referring to FIGS. 1 and 2.

The switches 32, 62, and the auxiliary switches 34, 64 are turned on when their respective control signal is high. The switching transistor 2 is a p-channel transistor, and thus, is turned on when the drive signal Vg is low. In order to allow the sense current IL1/N to flow in synchronization with this, the control signal S1 for the switch 32 is the inverted signal of the drive signal Vg. On the other hand, the control signal S2 for the switch 34 is low during the low period of the control signal S1, and its preceding and succeeding dead time periods. As such, the control signal S2 is in synchronization with the output of the comparator 5, which drives the rectifying transistor 4.

During the ON period of the switching transistor 2, the switch 32 is turned on, and thus, the gate of the output transistor 28 receives the gate voltage of the transistor 22, which corresponds to the current Is1 (=IL1/N). The output transistor 28 generates the current Is1, which corresponds to the voltage applied to its gate.

During the dead time period after the switch 32 is turned off, the capacitor 36 holds the gate voltage of the output transistor 28. As a result, the output transistor 28 continues to conduct the current Is1 during the dead time period. When the dead time ends, the rectifying transistor 4 is turned on, and at the same time, the auxiliary switch 34 is turned on. Consequently, the gate of the output transistor 28 is grounded, thereby causing the output transistor 28 not to conduct the current Is1.

The control signal S3 of the switch 62 is identical to the control signal S2. The control signal S4 of the switch 64 is identical to the control signal S1. During the ON period of the rectifying transistor 4, the switch 62 is turned on, and thus, the gate of the output transistor 58 receives the gate voltage of the transistor 55, which corresponds to the current Is2 (=IL2/N). The output transistor 58 generates the current Is2, which corresponds to the voltage applied to its gate.

During the dead time period after the switch 62 is turned off, the capacitor 66 holds the gate voltage of the output transistor 58. As a result, the output transistor 58 continues to conduct the current Is2 during the dead time period. When the dead time ends, the switching transistor 2 is turned on, and at the same time, the auxiliary switch 64 is turned on. Consequently, the gate of the output transistor 58 is grounded, thereby causing the output transistor 58 not to conduct the current Is2.

As shown in FIG. 2, the current Is (=Is1+Is2) flowing into the output node TC, to which the drains of the transistors 28 and 58 are connected, is held also during the dead time. Since the current Is is not forced to zero in every switching cycle of the switching transistor 2, the system can generate the current Is, which is a continuous signal in precise proportion to the inductor current IL.

Second Embodiment

Figure 3:
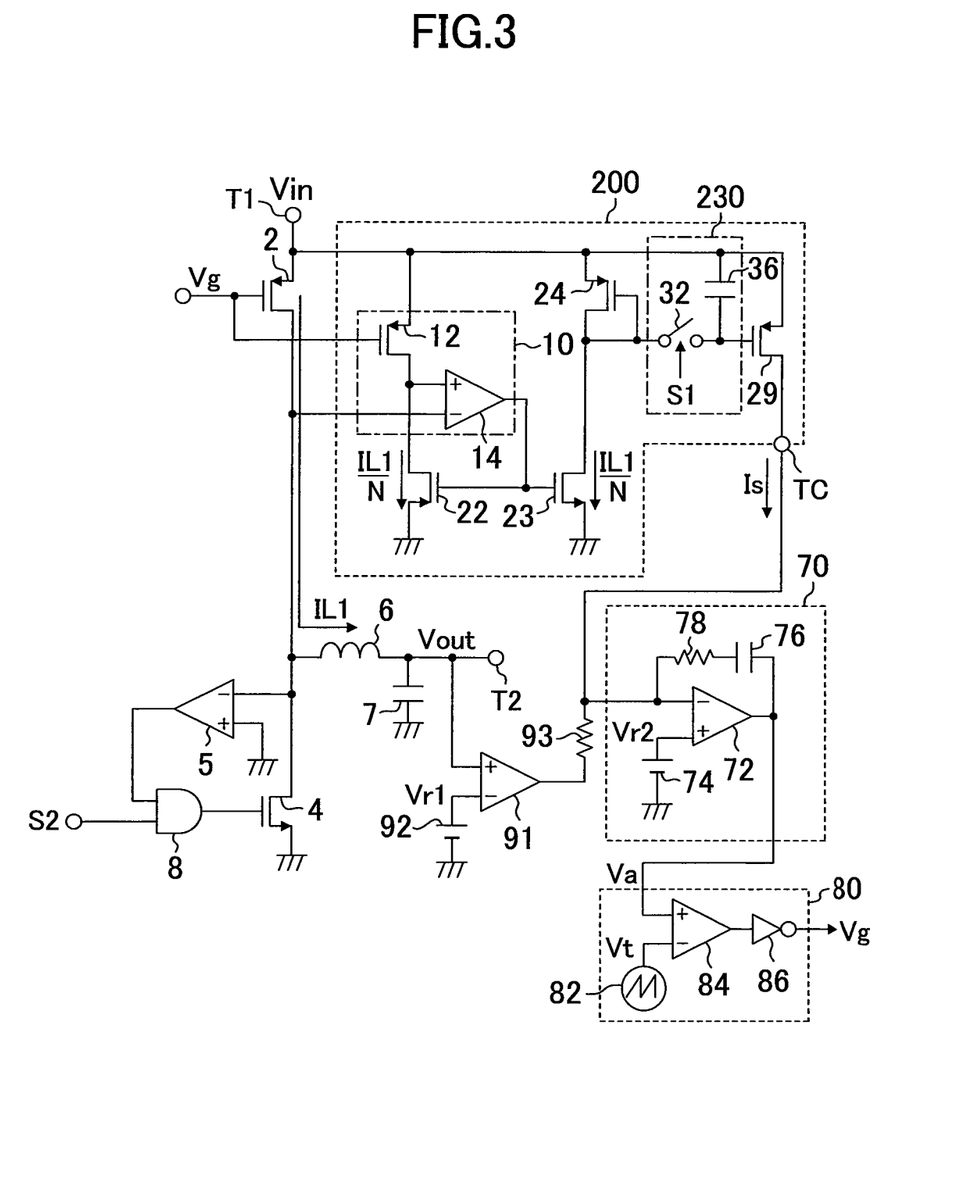
FIG. 3 is a circuit diagram illustrating an example configuration of a switching regulator including a current sense circuit according to a second embodiment.

FIG. 3 is a circuit diagram illustrating an example configuration of a switching regulator including a current sense circuit according to a second embodiment. The switching regulator of FIG. 3 is different from the switching regulator of FIG. 1 in that the switching regulator of FIG. 3 includes a current sense circuit 200 instead of the current sense circuit 100, and further includes a smoothing circuit 70, a drive signal generator 80, an error amplifier 91, a reference voltage source 92, and a resistor 93. The switching regulator of FIG. 3 regulates an output voltage Vout output from an output node T2 by using a sense current Is output from an output node TC.

The current sense circuit 200 includes the current generation circuit 10, the auxiliary transistor 22, an NMOSFET 23, a PMOSFET 24, an output transistor 29, which is a PMOSFET, and a hold circuit 230. The current generation circuit 10 and the auxiliary transistor 22 have been described above referring to FIG. 1. The hold circuit 230 includes the switch 32, and the capacitor 36.

The auxiliary transistor 22 and the transistor 23 form a current mirror. The PMOSFET transistor 24 and the output transistor 29 form a current mirror. The size of the auxiliary transistor 22 is the same as that of the transistor 23. The size of the transistor 24 is the same as that of the output transistor 29.

The gate of the output transistor 29 is connected to the gate of the transistor 24 through the switch 32. When the switch 32 is on (or closed), the output transistor 29 conducts the current IL1/N and the transistor 24 conducts the current IL1/N. This current is output from the output node TC as the sense current Is. The capacitor 36 is connected between the gate and source of the output transistor 29. The drain of the transistor 29 is connected to the output node TC. The switch 32 operates based on the control signal S1.

The smoothing circuit 70 includes an operational amplifier 72, a reference voltage source 74 which outputs a reference voltage Vr2, a capacitor 76, and a resistor 78. The drive signal generator 80 includes a triangular wave generator 82, a PWM (pulse width modulation) comparator 84, and an inverter 86.

The error amplifier 91 amplifies a difference between the output voltage Vout, and a reference voltage Vr1, which is a target voltage, of the reference voltage source 92, generates an error signal indicative of an error between the output voltage Vout and the reference voltage Vr1, and outputs the error signal to the operational amplifier 72 through the resistor 93. The operational amplifier 72 smoothes the input signal, and outputs the smoothed signal as an averaged signal Va to the PWM comparator 84. The triangular wave generator 82 generates a triangular wave voltage Vt. The PWM comparator 84 generates a pulse voltage based on the averaged signal Va and the triangular wave voltage Vt. The inverter 86 inverts the pulse voltage, and outputs the inverted pulse voltage as the drive signal Vg. The drive signal Vg is applied to the switching transistor 2.

Average current mode control performed by the above configuration will now be described. First, an inverting input of the operational amplifier 72 receives a voltage (Ve+Ri×Is) where the current Is denotes a sense current indicative of the current flowing through the inductor 6, Ve denotes the error signal output by the error amplifier 91, and Ri denotes the value of the resistor 93. The operational amplifier 72 smoothes and amplifies the difference between the voltage at the inverting input and the reference voltage Vr2, and outputs the obtained averaged signal Va.

The PWM comparator 84 compares the averaged signal Va with the triangular wave voltage Vt, and outputs the comparison result as the pulse voltage. The ratio of the high period of the pulse voltage to the entire period of the signal is equal to a duty cycle D, which is the ratio of the ON period of the switching transistor 2 to the entire period of the switching. When the triangular wave voltage Vt swings between voltages 0 and Et at a constant period of time, the duty cycle D is expressed:

$$D=Va/Et$$

When the output current from the output node T2 decreases, or when the input voltage Vin rises, for example, the output voltage Vout rises accordingly. If the increased output voltage Vout exceeds the reference voltage Vr1, the error voltage Ve rises. Due to the rise of the error voltage Ve, the voltage applied to the inverting input of the operational amplifier 72 rises, and thus, the averaged signal Va output by the operational amplifier 72 falls. The fall of the averaged signal Va causes the duty cycle D to decrease. Since the ON period of the switching transistor 2 is reduced, excitation energy stored in the inductor 6 decreases, and thus, the current flowing through the inductor 6 is reduced.

As a result, electric power supplied to the output node T2 through the inductor 6 is reduced, thereby causing the risen output voltage Vout to fall by negative feedback. By considering imaginary short at the input of the operational amplifier 72 in the smoothing circuit 70, the relationship in which the rise of the error voltage Ve causes the current flowing through the inductor 6 to decrease is expressed as follows:

$$Ve+Ri\times Is=Vr2$$

This means that the sense current Is varies inversely with the change of the error voltage Ve.

Here, AC (alternating current) components superimposed on the sense current Is are attenuated by the capacitor 76 and the resistor 78, and thus, the average value of the sense current Is varies with changes in the error voltage Ve. Due to the negative feedback, the output voltage Vout becomes equal to the reference voltage Vr1.

Figure 4:
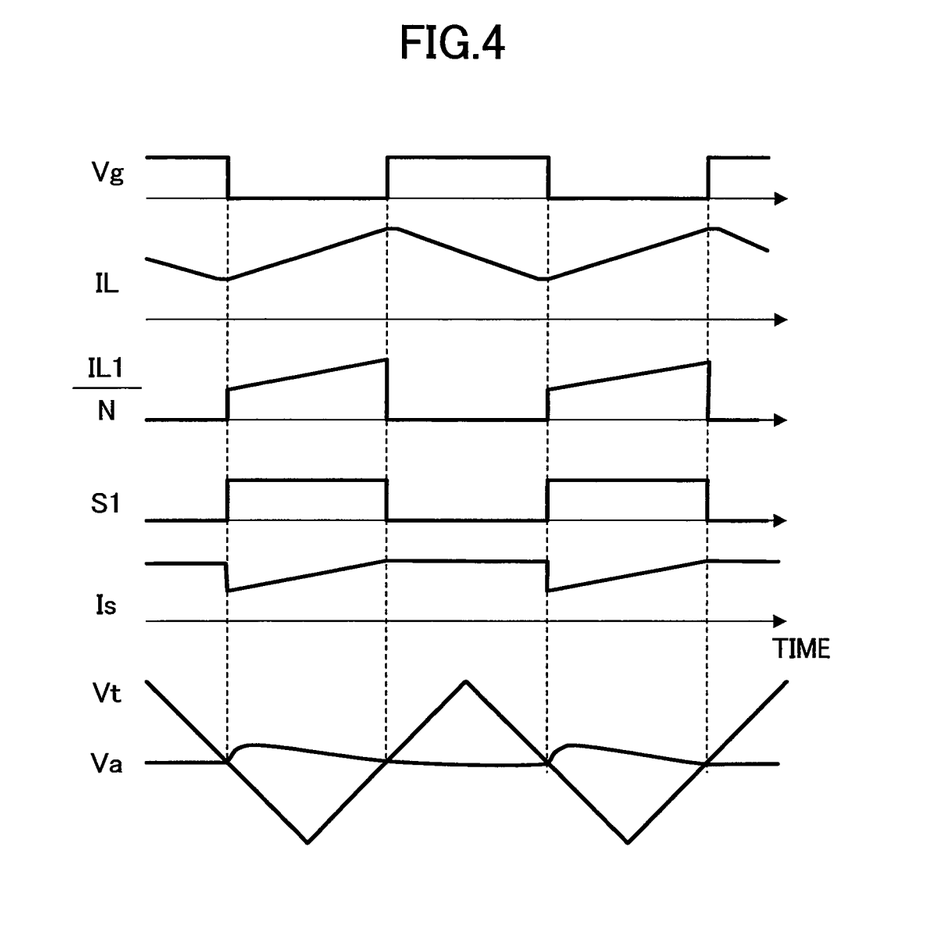
FIG. 4 is a graph illustrating waveforms of signals in the switching regulator of FIG. 3.

FIG. 4 is a graph illustrating waveforms of signals in the switching regulator of FIG. 3. FIG. 4 illustrates the drive signal Vg to the switching transistor 2, the current IL flowing through the inductor 6, the sense current IL1/N flowing through the sense transistor 12, the control signal S1 of the switch 32, the sense current Is flowing through the transistor 29, the triangular wave voltage Vt, and the averaged signal Va. Operation of the current sense circuit 200 of FIG. 3 will now be described referring to FIGS. 3 and 4.

The switching transistor 2 is a p-channel transistor, and thus, is turned on when the drive signal Vg is low. In order to allow the sense current IL1/N to flow in synchronization with this, the control signal S1 for the switch 32 is the inverted signal of the drive signal Vg.

During the ON period of the switching transistor 2, the switch 32 is turned on, and thus, the gate of the output transistor 29 receives the gate voltage of the transistor 24, which corresponds to the current Is (=IL1/N). The output transistor 29 generates the current Is, which corresponds to the voltage applied to its gate.

After the switch 32 is turned off, and until the switch 32 is turned on again, i.e., during the OFF period of the switching transistor 2, the capacitor 36 holds the gate voltage of the output transistor 29. As a result, the output transistor 29 continues to conduct the current Is during the OFF period. Therefore, the sense current Is is in proportion to the actual inductor current IL during the ON period of the switching transistor 2, and thus, has a waveform similar to that of the inductor current IL. However, in the average current mode control, accurate sensing of the inductor current is not necessary. For example, sensing of an approximate level of the inductor current IL, and control based on the sense current enable control of the output voltage Vout.

This average current mode control technique has an advantage of being less susceptible to switching noise since the drive signal is generated using an averaged signal of the inductor current. However, when both of the two currents of the switching transistor 2 and the rectifying transistor 4 are sensed and summed as in the first embodiment, abrupt changes in the current occur when the circuits for sensing respective transistor currents have unequal mirror ratios. An influence due to such changes cannot be removed by averaging, thereby risking the possibility of malfunction such as chattering.

By contrast, in this embodiment, the inductor current is sensed only during the ON period of the switching transistor 2, and the sense current value is held during the OFF period. As a result, abrupt changes in the sense current occur only when the switching transistor 2 is turned on. In addition, the influence of such an abrupt change appears as a rapid rise in the averaged signal Va immediately after the averaged signal Va exceeds the triangular wave voltage Vt. This prevents chattering, etc., thereby allowing stable operation of the switching regulator.

As described above, the current sense circuit of the present embodiment enables approximate sensing of the inductor current by sensing the current when the switching transistor 2 is turned on, and by holding the sensed value when the switching transistor 2 is turned off Variation of Second Embodiment For approximate sensing of the inductor current by sensing the current when the switching transistor 2 is turned on, and by holding the sensed value when the switching transistor 2 is turned off, as described in the second embodiment, caution must be taken if the duty cycle becomes zero. In such a case, the sense current Is is held without changing the sensed value, whereas the actual inductor current IL is decreasing.

Figure 5:
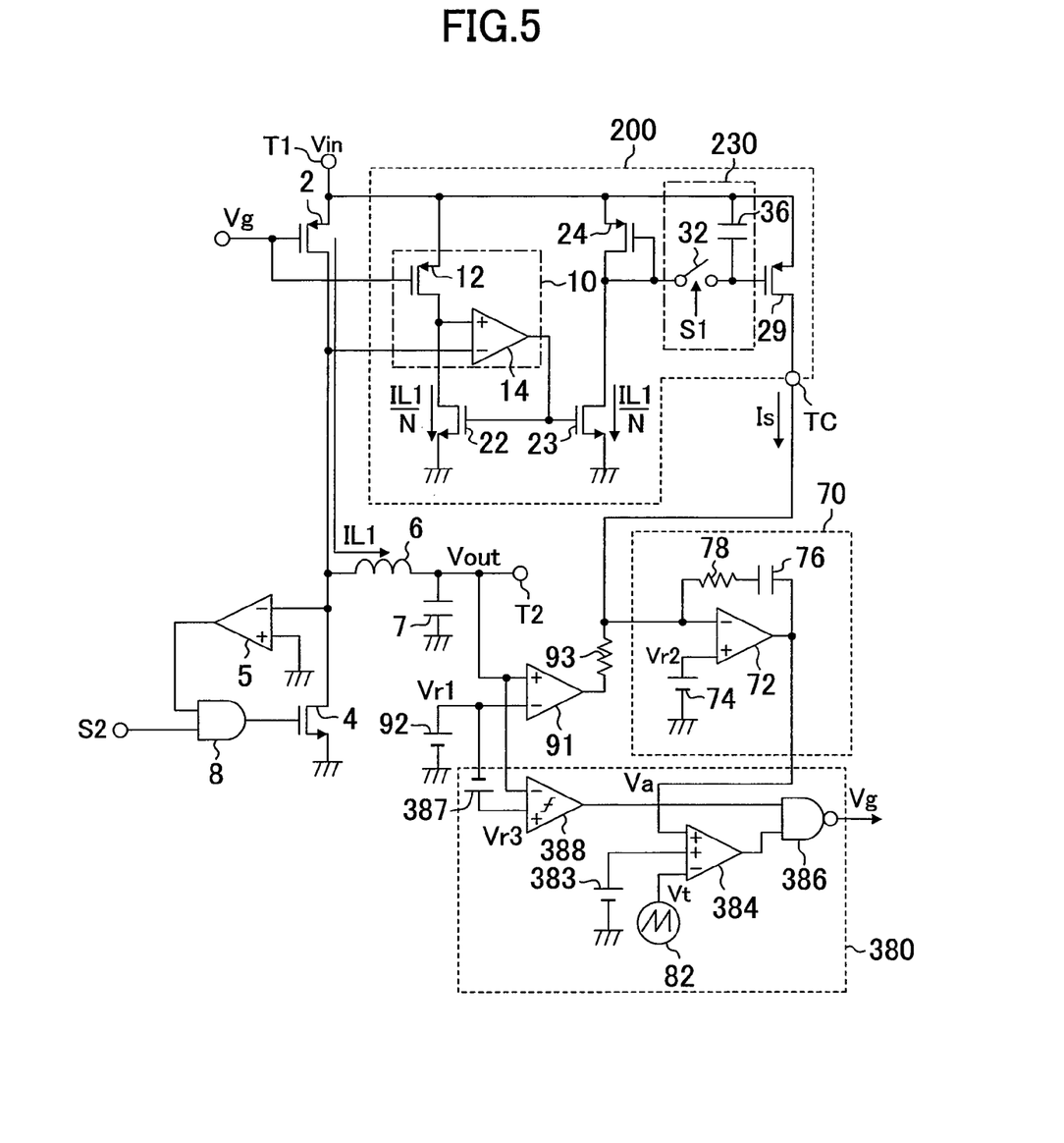
FIG. 5 is a circuit diagram illustrating an example configuration of a switching regulator including a current sense circuit according to a variation of the second embodiment.

FIG. 5 is a circuit diagram illustrating an example configuration of a switching regulator including a current sense circuit according to a variation of the second embodiment. The switching regulator of FIG. 5 is different from the switching regulator of FIG. 3 in that the switching regulator of FIG. 5 includes a drive signal generator 380 instead of the drive signal generator 80. The drive signal generator 380 includes the triangular wave generator 82, a reference voltage source 383, a PWM comparator 384, a NAND circuit 386, an offset voltage source 387, and a hysteresis comparator 388.

The PWM comparator 384 is different from the PWM comparator 84 in that the PWM comparator 384 further includes a non-inverting input which receives a reference voltage of the reference voltage source 383. The hysteresis comparator 388 compares a reference voltage Vr3, which is a sum of the reference voltage Vr1 and the voltage of the offset voltage source 387, with the output voltage Vout. The hysteresis of the hysteresis comparator 388 is set to the voltage of the offset voltage source 387, or a voltage which is close to that of the offset voltage source 387. The NAND circuit 386 outputs a logical product of the comparison result of the PWM comparator 384, and the comparison result of the hysteresis comparator 388 as the drive signal Vg.

The PWM comparator 384 prioritizes the use of the higher voltage between the two non-inverting inputs. The voltage of the reference voltage source 383 is set to cross the triangular wave voltage Vt at a predetermined lower voltage. The PWM comparator 384 outputs a pulse having a width which is determined by cross points of the voltage of the reference voltage source 383, and the triangular wave voltage Vt when the averaged signal Va is smaller than the voltage of the reference voltage source 383. Specifically, the width of the pulse output by the PWM comparator 384 is never smaller than a predetermined value, regardless of how much the averaged signal Va falls. In other words, the PWM comparator 384 outputs the pulse so that the ON period of the switching transistor 2 is longer than a predetermined threshold value (for example, so that the duty cycle is equal to or larger than the minimum duty cycle of Dmin). When the hysteresis comparator 388 outputs a high level, the NAND circuit 386 inverts the output signal of the PWM comparator 384, and outputs the inverted signal as the drive signal Vg.

In the switching regulator of FIG. 5, the current sense circuit 200 approximately senses the inductor current, and regulates the output voltage Vout by the average current mode control using the sense current, which is similar to the switching regulator of FIG. 3. However, at very light load, where the duty cycle is very small, the switching regulator of FIG. 5 operates in the following manner.

First, in order to regulate the output voltage Vout at light load, the switching regulator decreases the averaged signal Va, thereby reducing the inductor current supplied to the output node T2. However, the duty cycle does not fall below the minimum duty cycle Dmin, which is set by the voltage of the reference voltage source 383. As a result, the power supplied to the output node T2 becomes excessive, and thus, the output voltage Vout increases beyond the reference voltage Vr1, which is a target voltage. When the output voltage Vout exceeds the reference voltage Vr3, the hysteresis comparator 388 outputs a low level, and drives the drive signal Vg high through the NAND circuit 386, thereby turning off the switching transistor 2.

When the switching transistor 2 is turned off, the inductor current is not supplied to the output node T2, and thus, the output voltage Vout decreases. When the output voltage Vout decreases, reaching the reference voltage Vr1, the hysteresis comparator 388 drives the output high again. Here, the PWM comparator 384 compares the averaged signal Va with the triangular wave voltage Vt so that the drive signal Vg is output through the NAND circuit 386. This drive signal Vg allows the switching transistor 2 to restarts its switching operation. If the load at the output node T2 remains small, the switching operation at the minimum duty cycle Dmin causes the output voltage Vout to increase again, and repeats the above operation.

Alternatively, during the quiescent state when the switching operation by the hysteresis comparator 388 is halted, operation of other circuit elements constituting the switching regulator of FIG. 5 may also be halted to the extent that only necessary elements in the circuit are active, thereby reducing the power consumption.

As described above, according to the switching regulator of FIG. 5, the minimum duty cycle Dmin is set. This avoids a situation where the sense current Is continues to be held while the actual inductor current IL decreases. In addition, a rise in the output voltage Vout during light load conditions is detected by the hysteresis comparator 388, and the switching is halted when such a rise is detected. This operation prevents overvoltage conditions of the output voltage Vout, and also achieves, due to the halt period, low power consumption during the light load conditions.

Third Embodiment

In the switching regulators of FIGS. 3 and 5, the current is sensed during the ON period of the switching transistor, and then, the sense current is held during the OFF period of the switching transistor. In this embodiment, after sensing the current of the rectifying transistor, the sense current is held during the ON period of the switching transistor. Such a current sense method will be described below.

Figure 6:
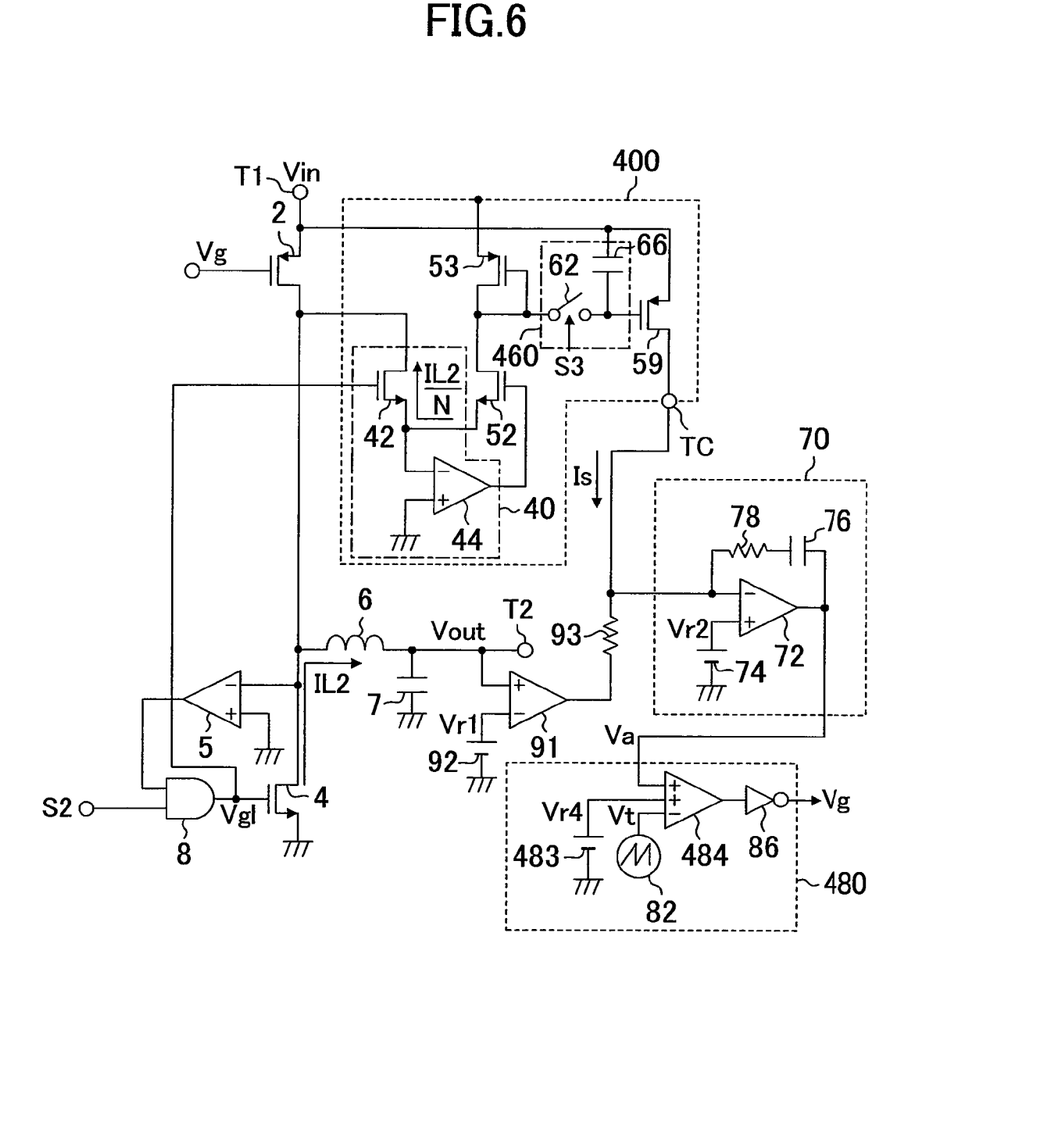
FIG. 6 is a circuit diagram illustrating an example configuration of a switching regulator including a current sense circuit according to the third embodiment.

FIG. 6 is a circuit diagram illustrating an example configuration of a switching regulator including a current sense circuit according to the third embodiment. The switching regulator of FIG. 6 is different from the switching regulator of FIG. 3 in that the switching regulator of FIG. 6 includes a current sense circuit 400 and a drive signal generator 480 instead of the current sense circuit 200 and the drive signal generator 80. The switching regulator of FIG. 6 regulates the output voltage Vout output from the output node T2 by using the sense current Is output from the output node TC.

The current sense circuit 400 includes the current generator 40, the auxiliary transistor 52, the PMOSFET 53, an output transistor 59, which is a PMOSFET, and a hold circuit 460. The current generator 40, the auxiliary transistor 52, and the PMOSFET 53 are similar to those described referring to FIG. 1.

The gate of the output transistor 59 is connected to the gate of the transistor 53 through the switch 62. The transistor 53 and the output transistor 59 form a current mirror. The size of the transistor 53 is the same as that of the output transistor 59. When the switch 62 is ON, the output transistor 59 conducts the current IL2/N and the transistor 53 conducts the current IL2/N. The capacitor 66 is connected between the gate and source of the output transistor 59. The drain of the output transistor 59 is connected to the output node TC. The switch 62 operates based on the control signal S3.

The drive signal generator 480 includes the triangular wave generator 82, a reference voltage source 483, a PWM comparator 484, and the inverter 86. The PWM comparator 484 is different from the PWM comparator 84 in that the PWM comparator 484 further includes a non-inverting input which receives a voltage Vr4 of the reference voltage source 483.

The PWM comparator 484 prioritizes the use of the lower voltage between the two non-inverting inputs. The voltage Vr4 of the reference voltage source 483 is set to cross the triangular wave voltage Vt at a predetermined higher voltage. The PWM comparator 484 outputs a pulse having a width which is determined by cross points of the voltage Vr4 and the triangular wave voltage Vt when the averaged signal Va is larger than the voltage Vr4. Specifically, the width of the pulse output by the PWM comparator 484 is never larger than a predetermined value, regardless of how much the averaged signal Va rises. In other words, the PWM comparator 484 outputs the pulse so that the ON period of the switching transistor 2 is equal to or shorter than a predetermined threshold value (for example, so that the duty cycle is equal to or smaller than the maximum duty cycle of Dmax). The inverter 86 inverts the output signal of the PWM comparator 484, and outputs the inverted signal as the drive signal Vg.

In the switching regulator of FIG. 6, the current sense circuit 400 approximately senses the inductor current, and regulates the output voltage Vout by the average current mode control using the sense current, which is similar to the switching regulator of FIG. 3.

Figure 7:
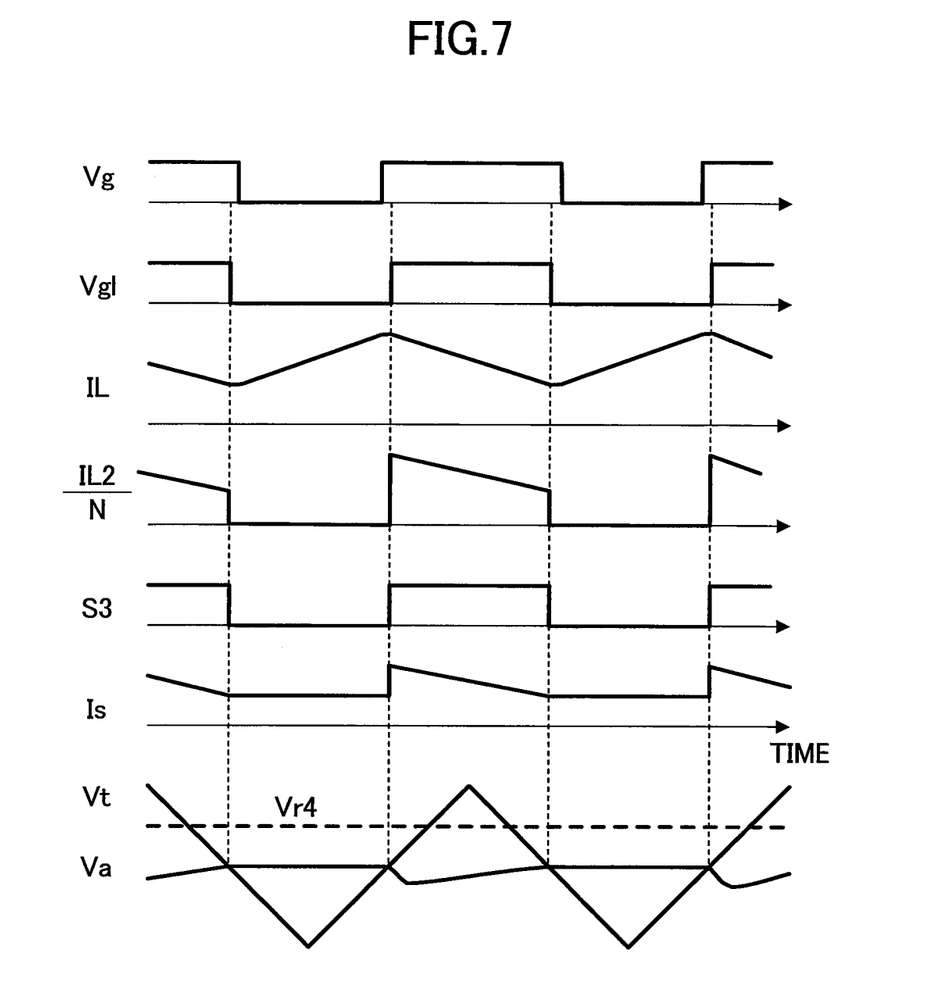
FIG. 7 is a graph illustrating waveforms of signals in the switching regulator of FIG. 6.

Next, an operation will be described where the current sense circuit 400 senses the current IL flowing through the inductor 6 as the sense current Is which is approximate to the current IL. FIG. 7 is a graph illustrating waveforms of signals in the switching regulator of FIG. 6. FIG. 7 illustrates the drive signal Vg to the switching transistor 2, the drive signal Vg1 to the rectifying transistor 4, the current IL flowing through the inductor 6, the sense current IL2/N flowing through the sense transistor 42, the control signal S3 of the switch 62, the sense current Is flowing through the transistor 59, the triangular wave voltage Vt, and the averaged signal Va. Operation of the current sense circuit 400 of FIG. 6 will now be described referring to FIGS. 6 and 7.

The switching transistor 4 is an n-channel transistor, and thus, is turned on when the drive signal Vg1 is high. In order to allow the sense current IL2/N to flow in synchronization with this, the control signal S3 for the switch 62 is the same as the drive signal Vg1.

During the ON period of the rectifying transistor 4, the switch 62 is turned on, and thus, the gate of the output transistor 59 receives the gate voltage of the transistor 53, which corresponds to the current Is (=IL2/N). The output transistor 59 generates the current Is, which corresponds to the voltage applied to its gate.

After the switch 62 is turned off, and until the switch 62 is turned on again, i.e., during the OFF period of the rectifying transistor 4, the capacitor 66 holds the gate voltage of the output transistor 59. As a result, the output transistor 59 continues to conduct the current Is during the OFF period. Therefore, the sense current Is is in proportion to the actual inductor current IL only during the ON period of the rectifying transistor 4, and thus, has a waveform similar to that of the inductor current IL. However, in the average current mode control, accurate sensing of the inductor current is not necessary. For example, sensing of an approximate level of the inductor current IL, and control based on the sense current enable control of the output voltage Vout.

In this embodiment, the inductor current is sensed only during the ON period of the rectifying transistor 4, and the sense current value is held during the OFF period. As a result, abrupt changes in the sense current occur only when the switching transistor 2 is turned off. In addition, as shown in FIG. 7, the influence of such an abrupt change appears as a rapid fall in the averaged signal Va immediately after the averaged signal Va falls below the triangular wave voltage Vt. This prevents chattering, etc., thereby allowing stable operation of the switching regulator.

For approximate sensing of the inductor current by sensing the current when the switching transistor is turned off, and by holding the sensed value when the switching transistor is turned on, as described in this embodiment, caution must be taken if the duty cycle becomes one. In such a case, the sense current Is is held without changing the sensed value, whereas the actual inductor current IL is increasing. Because of this, the duty cycle of the pulse output by the PWM comparator 484 is set to be equal to or smaller than the maximum duty cycle Dmax.

As described above, the current sense circuit of the present embodiment enables approximate sensing of the inductor current by sensing the current when the rectifying transistor 4 is turned on, and by holding the sensed value when the rectifying transistor 4 is turned off.

In the embodiments described above, a current sense circuit senses a current flowing through a step down switching regulator. However, the present invention is not limited to the specific circuit configuration. The current sense circuit according to the invention may be employed for use with a switching regulator which continuously outputs a current from a node connecting two switches which are connected in series. In other words, the present invention is not limited to use with a step down switching regulator, but may be employed for use with a step up switching regulator, or an inverting switching regulator.

In the foregoing description, the invention has been described with reference to specific example embodiments thereof. It will, however, be evident that various modifications and changes may be made thereto without departing from the broader spirit and scope of the invention as set forth in the appended claims. The specification and drawings are, accordingly, to be regarded in an illustrative rather than in a restrictive sense.

What is claimed is:

1. A current sense circuit for use with a switching regulator including a first transistor, connected to an inductor, configured to switch a current flowing through the inductor from a power supply; and a second transistor, connected to a node to which the inductor and the first transistor are connected, configured to be turned on during a part of an OFF period of the first transistor, the current sense circuit comprising:
   a current generator configured to generate a sense current corresponding to a current flowing through the first transistor;
   a hold circuit configured to output a voltage corresponding to the sense current during an ON period of the first transistor, and to hold and output the voltage corresponding to the sense current during the OFF period of the first transistor; and
   an output transistor configured to generate a current corresponding to the voltage output by the hold circuit.

2. The current sense circuit of claim 1, further comprising:
   an auxiliary transistor configured to conduct the sense current,
   wherein
   the hold circuit includes
      a switch, having a first end connected to a control electrode of the auxiliary transistor, or a control electrode of a transistor configured to conduct a current proportional to the sense current, configured to be turned on during the ON period of the first transistor, and
a capacitor connected to a second end of the switch, and
the output transistor includes a control electrode connected to the second end of the switch.

3. A current sense circuit for use with a switching regulator including a first transistor, connected to an inductor, configured to switch a current flowing through the inductor from a power supply; and a second transistor, connected to a node to which the inductor and the first transistor are connected, configured to be turned on during a part of an OFF period of the first transistor, the current sense circuit comprising:
a current generator configured to generate a sense current corresponding to a current flowing through the second transistor;
a hold circuit configured to output a voltage corresponding to the sense current during an ON period of the second transistor, and to hold and output the voltage corresponding to the sense current during the OFF period of the second transistor; and
an output transistor configured to generate a current corresponding to the voltage output by the hold circuit.

4. The current sense circuit of claim 3, further comprising:
an auxiliary transistor configured to conduct the sense current,
wherein
the hold circuit includes
a switch, having a first end connected to a control electrode of the auxiliary transistor, or a control electrode of a transistor configured to conduct a current proportional to the sense current, configured to be turned on during the ON period of the second transistor, and
a capacitor connected to a second end of the switch, and
the output transistor includes a control electrode connected to the second end of the switch.

5. A current sense circuit for use with a switching regulator including a first transistor, connected to an inductor, configured to switch a current flowing through the inductor from a power supply; and a second transistor, connected to a node to which the inductor and the first transistor are connected, configured to be turned on during a part of an OFF period of the first transistor, the current sense circuit comprising:
a first current generator configured to generate a first sense current corresponding to a current flowing through the first transistor;
a first hold circuit configured to output a voltage corresponding to the first sense current during an ON period of the first transistor, and to hold and output the voltage corresponding to the first sense current during a period when both of the first and the second transistors are turned off;
a first output transistor configured to generate a current corresponding to the voltage output by the first hold circuit;
a second current generator configured to generate a second sense current corresponding to a current flowing through the second transistor;
a second hold circuit configured to output a voltage corresponding to the second sense current during an ON period of the second transistor, and to hold and output the voltage corresponding to the second sense current during the period when both of the first and the second transistors are turned off; and
a second output transistor configured to generate a current corresponding to the voltage output by the second hold circuit,
wherein the first and the second output transistors are connected in parallel.

6. The current sense circuit of claim 5, further comprising:
a first auxiliary transistor configured to conduct the first sense current; and
a second auxiliary transistor configured to conduct the second sense current,
wherein
the first hold circuit includes
a first switch, having a first end connected to a control electrode of the first auxiliary transistor, or a control electrode of a transistor configured to conduct a current proportional to the first sense current, configured to be turned on during the ON period of the first transistor, and
a first capacitor connected to a second end of the first switch,
the first output transistor includes a control electrode connected to the second end of the first switch,
the second hold circuit includes
a second switch, having a first end connected to a control electrode of the second auxiliary transistor, or a control electrode of a transistor configured to conduct a current proportional to the second sense current, configured to be turned on during the ON period of the second transistor, and
a second capacitor connected to a second end of the second switch, and
the second output transistor includes a control electrode connected to the second end of the second switch.

7. The current sense circuit of claim 6, wherein
the first hold circuit includes a first auxiliary switch configured to operate in synchronization with the second switch, and
the second hold circuit includes a second auxiliary switch configured to operate in synchronization with the first switch.

8. A switching regulator, comprising:
an inductor;
a first transistor, connected to an inductor, configured to switch a current flowing through the inductor from a power supply;
a second transistor, connected to a node to which the inductor and the first transistor are connected, configured to be turned on during a part of an OFF period of the first transistor; and
a current sense circuit,
wherein
the current sense circuit includes
a current generator configured to generate a sense current corresponding to a current flowing through the first transistor;
a hold circuit configured to output a voltage corresponding to the sense current during an ON period of the first transistor, and to hold and output the voltage corresponding to the sense current during the OFF period of the first transistor; and
an output transistor configured to generate a current corresponding to the voltage output by the hold circuit.

9. The switching regulator of claim 8, further comprising:
an averaging circuit configured to average the current generated by the output transistor, and to output the averaged signal; and a drive signal generator configured to generate a drive signal for controlling the first transistor based on the averaged signal.

10. The switching regulator of claim 9, further comprising:
an error amplifier configured to generate an error signal indicative of an error between an output voltage and a target voltage of the switching regulator,
wherein
the averaging circuit generates the averaged signal by averaging a sum of the current generated by the output transistor and the error signal, and
the drive signal generator includes
a triangular wave generator configured to generate a triangular wave signal, and
a comparator configured to generate the drive signal by comparing the averaged signal with the triangular wave signal.

11. The switching regulator of claim 9, wherein
the drive signal generator generates the drive signal so that the ON period of the first transistor is longer than a predetermined threshold.

12. The switching regulator of claim 11, wherein
the drive signal generator generates the drive signal so that switching of the first transistor is halted when the output voltage of the switching regulator rises to a predetermined voltage higher than the target voltage.

13. A switching regulator, comprising:
an inductor;
a first transistor, connected to an inductor, configured to switch a current flowing through the inductor from a power supply;
a second transistor, connected to a node to which the inductor and the first transistor are connected, configured to be turned on during a part of an OFF period of the first transistor; and
a current sense circuit,
wherein
the current sense circuit includes
a current generator configured to generate a sense current corresponding to a current flowing through the second transistor;
a hold circuit configured to output a voltage corresponding to the sense current during an ON period of the second transistor, and to hold and output the voltage corresponding to the sense current during the OFF period of the second transistor; and
an output transistor configured to generate a current corresponding to the voltage output by the hold circuit.

14. The switching regulator of claim 13, further comprising:
an averaging circuit configured to average the current generated by the output transistor, and to output the averaged signal; and
a drive signal generator configured to generate a drive signal for controlling the first transistor based on the averaged signal.

15. The switching regulator of claim 14, further comprising:
an error amplifier configured to generate an error signal indicative of an error between an output voltage and a target voltage of the switching regulator,
wherein
the averaging circuit generates the averaged signal by averaging a sum of the current generated by the output transistor and the error signal, and
the drive signal generator includes
a triangular wave generator configured to generate a triangular wave signal, and
a comparator configured to generate the drive signal by comparing the averaged signal with the triangular wave signal.

16. The switching regulator of claim 14, wherein
the drive signal generator generates the drive signal so that the ON period of the first transistor is shorter than a predetermined threshold.

17. A switching regulator, comprising:
an inductor;
a first transistor, connected to an inductor, configured to switch a current flowing through the inductor from a power supply;
a second transistor, connected to a node to which the inductor and the first transistor are connected, configured to be turned on during a part of an OFF period of the first transistor; and
a current sense circuit,
wherein
the current sense circuit includes
a first current generator configured to generate a first sense current corresponding to a current flowing through the first transistor;
a first hold circuit configured to output a voltage corresponding to the first sense current during an ON period of the first transistor, and to hold and output the voltage corresponding to the first sense current during a period when both of the first and the second transistors are turned off;
a first output transistor configured to generate a current corresponding to the voltage output by the first hold circuit;
a second current generator configured to generate a second sense current corresponding to a current flowing through the second transistor;
a second hold circuit configured to output a voltage corresponding to the second sense current during an ON period of the second transistor, and to hold and output the voltage corresponding to the second sense current during the period when both of the first and the second transistors are turned off; and
a second output transistor configured to generate a current corresponding to the voltage output by the second hold circuit, and
the first and the second output transistors are connected in parallel.

* * * * *